United States Patent Office 2,972,808
Patented Feb. 28, 1961

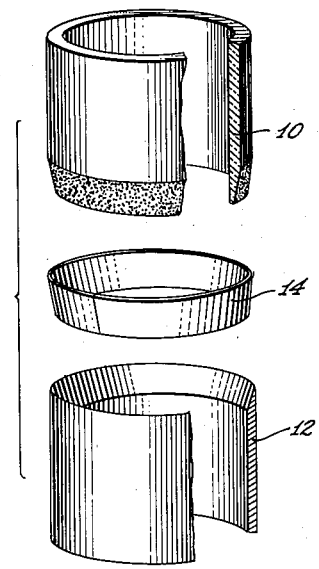
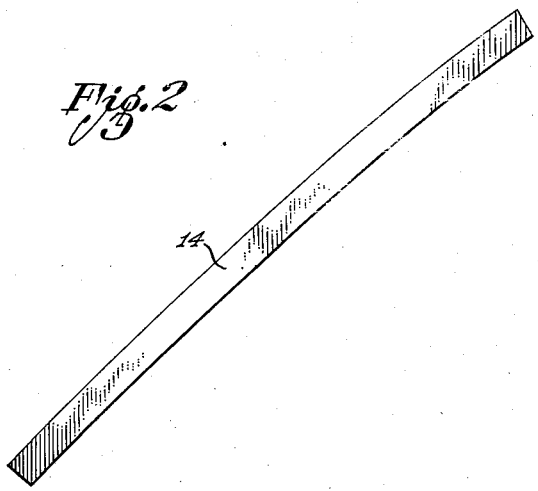
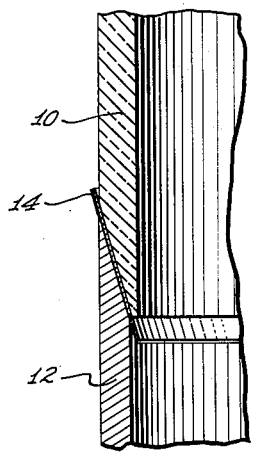
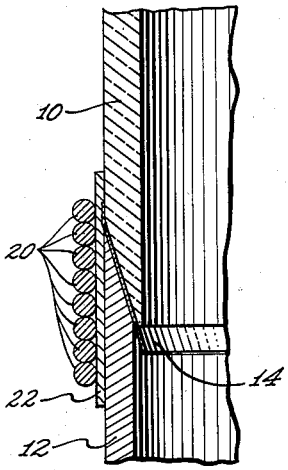
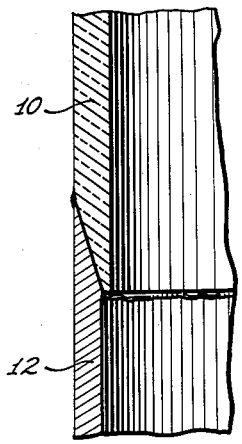

2,972,808
CERAMIC-TO-METAL SEALS

Charles V. Litton, Grass Valley, Calif., assignor to Litton Engineering Laboratories, Grass Valley, Calif.

Filed Apr. 3, 1957, Ser. No. 650,451

11 Claims. (Cl. 29—473.1)

This invention relates to ceramic-to-metal seals, and more particularly to ceramic-to-metal seals in which the ceramic and metal are bonded together securely over a tapered seal region, and to methods for producing these seals.

In relatively recent years it has come to be recognized that in many technological fields, and especially in the vacuum tube art, ceramic-to-metal seals may be utilized advantageously in lieu of glass-to-metal seals to overcome serious problems theretofore encountered. More specifically, in the vacuum tube art it has been found that many tube failures are caused by breakage of the inherently fragile glass portions of the vacuum tube envelope, or by the fact that glass is often unable to accept the high operating temperatures which may be generated in high power tubes in particular. Moreover, the high temperature limitations of glass also limit the utility of the baking process which is carried out as part of the exhaust procedure in the construction of high-vacuum envelopes, such as those employed in magnethons for example; consequently the tubes are not outgassed as rigorously as they are where ceramic is employed in place of glass in the construction of the vacuum tube envelope.

In the ceramic-to-metal seals of the prior art it is customary to form the seal by first metallizing the flat end or lateral periphery of a ceramic cylinder by applying molybdenum powder thereto and then heating the cylinder to a temperature of the order of 1600° C. A similar process is then carried out using nickel and heating the cylinder to a temperature of the order of 1100° C. to create a nickel flashing over the metallized surface of the ceramic. Finally, the metallized surface of the ceramic is brought into abutting engagement with the metallic member to which it is to be joined and is affixed thereto with either a conventional silver solder or gold solder.

Although ceramic-to-metal seals manufactured according to the foregoing process may function satisfactorily if the process is carried out carefully, there are several inherent disadvantages which detract from the utility of the process and of the articles formed thereby. Firstly, from the standpoint of the article per se, when the seal is made to the flat end of the ceramic cylinder, the seal is frequently weak structurally owing to the fact that its area is limited to the cross-sectional area of the cylinder. Similarly, where the seal is made to the lateral periphery of the cylinder, the seal frequently will leak or form gas traps which subsequently cause failure of the vacuum tube or other device in which it is utilized, one reason for this form of failure being that it is difficult to bring the ceramic and the metal to which it is to be sealed into uniform engagement. From the process standpoint, furthermore, the prior art process set forth hereinabove requires very precise machining of the ceramic and metal parts in order to assure even a reasonably good seal. Moreover, the separate nickel flashing step of the process is both time-consuming and expensive in terms of labor and equipment, and may result in lack of uniformity in the completed seal.

The present invention, on the other hand, provides ceramic-to-metal seals, and methods for making them, which overcome the above and other disadvantages of the methods and articles of the prior art. According to the basic concept of the present invention, ceramic-to-metal seals are formed by conjugately tapering the ceramic and metallic elements of the seal, and thereafter bonding the elements together along their tapered regions to thereby provide a relatively large seal region having increased structural strength and free of defects which might subsequently cause gassing of the device in which the seal is to be employed.

More specifically, according to the methods of the invention, the ceramic cylinder is first tapered at one end and is then metallized over its tapered region, as through the utilization of an iron-manganese-tungsten powder or the molybdenum-manganese of the prior art. The cylinder and a metallic sleeve which has been tapered in a conjugate manner are then brought together with a thin strip of copper-nickel alloy sandwiched between the tapered surfaces thereof, after which the combination is heated to melt the alloy strip and thereby create a brazed joint between the metallized ceramic and the associated metal sleeve. The formation of a tapered seal region and the utilization of a copper-nickle alloy thereby combine to provide an improved ceramic-to-metal seal whose manufacturing process is simpler than the analogous processes of the prior art.

In accordance with the preferred method of the invention the ceramic cylinder is tapered externally and the mating metal sleeve is tapered internally to eliminate tensile stresses on the ceramic during the final assembly operation. In addition, it is also a feature of the invention to provide means for temporarily binding the lateral periphery of the seal region during the final assembly operation to assure that the brazing alloy forms a uniform bond free of fissures, and in addition, to control precisely the length of the seal region and hence the overall length of the completed ceramic-to-metal seal.

It is, therefore, an object of the invention to provide improved ceramic-to-metal seals and methods for making them.

Another object of the invention is to provide ceramic-to-metal seals wherein a ceramic cylinder and metal sleeve are bonded together securely and hermetically over a tapered seal region.

A further object of the invention is to provide brazing alloys for securely bonding a metallic sleeve to a ceramic cylinder.

Another object of the invention is to provide methods for precisely controlling the thickness and uniformity of a hermetic seal formed between a tapered ceramic seal and a conjugally tapered metal sleeve or cylinder.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of either the articles or methods of the invention.

Fig. 1 is a perspective view, partly in section, of the elements which are joined to form a ceramic-to-metal seal in accordance with the invention;

Fig. 2 is a developed view of an alloy strip which may constitute one of the elements shown in Fig. 1;

Fig. 3 is a fragmentary sectional view illustrating the relationship of the elements shown in Fig. 1 preparatory to forming a ceramic-to-metal seal;

Fig. 4 is a fragmentary sectional view of the elements shown in Fig. 1 illustrating the additional binding process which may be carried out prior to the final assembly operation; and Fig. 5 is a sectional view of a portion of a completed ceramic-to-metal seal, according to the invention.

With reference now to the drawings wherein like or corresponding parts are designated by the same reference characters throughout the several views, there is shown in Fig. 1 the basic elements which are united to form a ceramic-to-metal seal in accordance with the invention. As shown in Fig. 1 these elements include a hollow ceramic cylinder 10 one end of which has been tapered and metallized in a manner to be hereinafter described, a hollow metallic sleeve or cylinder 12 one end of which has also been tapered to mate conjugately with the tapered end of the ceramic cylinder, and an alloy strip 14 formed in the shape of a conical frustrum to be sandwiched between the tapered ends of the ceramic and metal cylinders during the final assembly operation.

Metallic sleeve 12 is preferably constructed of Kovar or any other material whose coefficient of thermal expansion is similar to that of the particular ceramic material employed in forming ceramic cylinder 10. In addition, the outside diameter of sleeve 12 is preferably the same as that of the ceramic cylinder 10, although it will be appreciated from an understanding of the invention as set forth below that the basic concepts herein disclosed are not to be restricted to any particular relationship between the dimensions of the metallic sleeve and ceramic cylinder.

In accordance with the invention, the material from which ceramic cylinder 10 is fabricated must satisfy several different criteria. Firstly, it must be gas tight or non-porous so that the completed seal will be hermetic in all of its constituent parts. Secondly, the ceramic must be thermally shock resistant in a dual manner, namely, it must be able to withstand high temperatures, such as those which occur in the bake-out process in the exhaust procedure in the manufacture of high vacuum tubes, and it must be able to withstand relatively high temperature gradients such as those which occur when one end of the ceramic is connected to a heat sink while the other end is connected to an element at ambient temperature. Thirdly, the material should have a relatively high dielectric constant, and a thermal coefficient of expansion similar to that of the metallic cylinder to which it is to be sealed. Finally, the ceramic should have a relatively high working temperature to thereby permit vacuum tubes in which it is used to be outgassed and baked at relatively high temperatures, as for example temperatures of the order of 700° centigrade.

One material which has been found to satisfy the foregoing criteria is high purity crystalline alumina, which may be obtained from suppliers in the form of prefabricated ceramic cylinders. For example, the Coors Porcelain Company of Golden, Colorado, will furnish cylinders of alumina of the desired purity and having the desired dimensions. Two specific alumina compounds which have been utilized in practicing the invention are designated by the Coors Company as Al-200, which contains approximately 96% aluminum oxide ($Al_2O_3$), and AB-2 which contains approximately 85% aluminum oxide.

In accordance with the invention the alumina cylinders are first ground to the desired outside dimension, as with a diamond wheel, and are then ground at one end to provide an external taper such as that shown at the lower end of ceramic cylinder 10 shown in Fig. 1. As a corrolary step in the process of the invention, the metal sleeve or cylinder 12 shown in Fig. 1 is also ground or otherwise machined at one end to provide an internal taper having the same angle of taper with respect to the axis of the sleeve as the external taper on the ceramic cylinder.

The precise angle of taper utilized in machining the ceramic cylinder and the metallic sleeve is in turn selected in view of several different factors. Firstly, the angle of taper should be selected to provide a mating tapered surface which is relatively long compared with the thickness of the metal sleeve and the ceramic cylinder. For example, if a metal sleeve has a thickness of the order of .020″, the length of the mating surface should be on the order of one eighth of an inch to insure a structurally sound bond between the metal and ceramic; consequently the angle of taper should be relatively small. It should be noted that the utilization of a relatively small angle of taper has an added advantage during the final assembly operation in that a relatively small axial load is capable of creating a relatively high pressure between the tapered surfaces which are being joined.

There are, however, other factors which limit the minimum size of the angle of taper. For example, if the total length of the ceramic cylinder and metal sleeve after assembly is important, as where the ceramic-to-metal seal is part of a concentric cathode structure in a magnetron vacuum tube wherein the cathode must be properly aligned axially with the anode, the taper should be limited to an angle such that an accurate overall dimension may be achieved by utilizing a ceramic cylinder and metal sleeve of predetermined length. In addition, the angle of taper is also limited by the fact that if made too small, the tapered end of the metallic sleeve may become structurally weak and rupture during the final assembly operation.

In practice it has been found that in general a taper within the range between 5 and 15 degrees in the ceramic cylinder and metallic sleeve provides a reasonable compromise and satisfies the factors set forth hereinabove. More particularly, in forming seals between relatively small diameter sleeves and cylinders, a taper of approximately 7° provides sufficient seal area and structural strength in the seal. On the other hand, if the diameter of the parts being joined is relatively large, a taper on the order of 15° is preferred in order to assure proper structural support for the seal against atmospheric pressure when the seal components are subsequently utilized as part of the envelope in an evacuated device. It is to be understood, however, that the angle of taper may be varied from the above specified range without departing from other inventive concepts herein taught. For example, it will be recognized that if the overall length of the completed assembly is to be controlled precisely without subsequent machining operations, then a relatively large angle of taper may be employed.

Returning now to the description of the processing of the ceramic cylinder, after the cylinder has been ground and tapered it should next be cleaned to remove any impurities on its surface in preparation for the subsequent metallizing process which is carried out on the tapered region thereof. In carrying out the cleaning operation any suitable cleansing process known to the art may be employed, such as immersing the cylinder in hydrofluoric acid, or by firing the cylinder at an elevated temperature. If the latter technique is preferred, the cylinder may be cleansed by firing it in air for approximately one-half hour at a temperature of 1100° C.

Following the foregoing cleaning step the tapered surface of the ceramic cylinder is then metallized to provide a secure base for affixing the metallic sleeve to the ceramic, the metallizing process being carried out by first applying a metallizing film to the tapered end of the ceramic cylinder, and then heating the cylinder to a predetermined temperature whereat the powder penetrates the adjacent ceramic material and thereby provides a metallized surface.

More specifically, the metallizing process may be carried out by mixing predetermined proportions of powdered tungsten, iron and manganese in a suitable acetate carrier. The solution may then be painted or sprayed on the tapered portion of the ceramic cylinder, after which the cylinder is ready for the firing process. In accordance with the methods of the invention, an excellent metallized surface may be produced by utilizing a powder containing tungsten, iron and manganese within the following ranges by weight:

| | Percent |
|---|---|
| W | 80–90 |
| Fe | 10–5 |
| Mn | 10–5 |

The metallizing step itself is then carried out by heating the ceramic cylinder in either a hydrogen or forming gas atmosphere to a temperature approaching the melting point of iron, and holding this temperature constant for a predetermined interval thereafter. The specific temperature at which the metallizing process is carried out is dependent to some extent upon the composition of the ceramic cylinder, a temperature within the range from 1520° C. to 1540° C. having been found suitable for an alumina cylinder composed of Coors' Al-200 material, while a slightly lower temperature of the order of 1500° C. may be utilized satisfactorily with a cylinder of the aforementioned AB-2 alumina.

The length of the interval through which the metallizing process is carried out in turn determines the depth of penetration into the ceramic of the metallizing film. It has been found that for most purposes twenty minutes is sufficient to provide a secure metallized surface on the ceramic cylinder. If greater penetration is desired, however, the metallizing process should consume on the order of thirty minutes. One test which may be utilized to determine the proper time interval empirically is to stress a completed ceramic-to-metal seal until it ruptures; in general it will be found that the ceramic per se will rupture instead of the seal region when the metallizing process is carried out through a sufficiently long time interval.

Following the fabrication of ceramic cylinder 10 and metallic sleeve 12 in Fig. 1, alloy strip 14 must be formed to complete the elements essential to the formation of ceramic-to-metal seal according to the invention. As shown in Fig. 2, the alloy strip may be die punched from an alloy sheet of predetermined constituency and in the shape of a projected or developed conical frustrum. The curvature of the punched strip is of course selected to provide a conical frustrum which forms the same angle with the longitudinal axis passing therethrough as the angle of taper on the ceramic cylinder and metal sleeve. The length and width of the punched strip, in turn, are selected to that when the ends of the strip are brought into abutting engagement the area of the conical frustrum thus formed covers the entire tapered regions of the cylinder and sleeve.

In practice it has been found desirable to use a punched strip which is slightly wider than the minimum possible width so that a small portion of the strip normally projects beyond the tapered regions of the cylinder and sleeve on the opposite sides thereof. Consequently, each of the strips which are punched will assuredly cover the entire tapered region of both cylinder and sleeve despite minor deviations which may occur in the length of the punched strips due to the punching process. It should be here noted that although the alloy strip is shown as punched from a flat alloy sheet, the conical frustrum 14 in Fig. 1 could also be formed by punching and drawing a closed cone of the brazing alloy.

In accordance with the invention, the sheet material from which the strips are punched is an alloy of copper and nickel and is of the order of one mil in thickness, the nickel being utilized to provide a base or flashing on the metallized ceramic to which the copper in the alloy will readily adhere. It should be noted here that the utilization of a copper-nickel alloy represents a marked deviation from analogous processes in the prior art, wherein a nickel flashing is applied to the metallized ceramic by carrying out a completely separate process step. The utilization of an alloy as taught by the present invention not only eliminates this prior art step but also assures a complete and uniform bond in the completed ceramic-to-metal seal.

Although the constituency of the elements in the alloy may be varied with some degree of freedom, in accordance with the invention it has been found preferable to use 85% to 95% copper by weight and 15% to 5% nickel by weight in the alloy. There are basically two factors which control the amount of nickel utilized, namely, a minimum of approximately 5% nickel is necessary to assure a good mechanical bond, whereas too much nickel produces an alloy which is relatively hard and non-ductile. In addition, a high nickel alloy will frequently provide a sink for electrical energy at RF frequencies. Inasmuch as a prime application of ceramic-to-metal seals is in ultra high frequency vacuum tubes, it will be appreciated that in many instances it will be preferable to employ as little nickel as possible in the alloy while still retaining a structurally sound seal.

After each of the elements shown in Fig. 1 has been processed or fabricated in the manner indicated hereinabove, they are assembled as shown in Fig. 3 with the alloy strip 14 sandwiched between ceramic cylinder 10 and Kovar sleeve 12. At this point the final assembly operation may be carried out directly, if desired, by heating the assembly in a hydrogen atmosphere to a temperature of the order of 1100° C. whereat fusion of the alloy strip with the adjacent metal and metallized surface occurs, thereby producing a brazed joint which completes the ceramic-to-metal seal.

It should be noted here, however, that in accordance with the invention it is recommended that a further operational step be carried out prior to the final fusion process to assure a structurally sound seal free from pipes and fissures, and to eliminate any tendency of the metallic sleeve to spread or flare under the influence of the elevated temperature and axial load employed in the fusion process. Basically, this further step comprises a binding operation which is carried out prior to the fusion process to thereafter maintain constant the outside diameter of the metallic sleeve while the fusion process is being carried out. The primary purpose of this additional step is to prevent the region occupied by the alloy strip from enlarging during the fusion process so that there is insufficient alloy to fill the entire seal region; if this occurs, not only may the wetting of the tapered surfaces be incomplete, but hydrogen may be drawn into the alloy and thereby create gas traps and fissures which subsequently may cause gassy tubes or leaky seals.

To better illustrate the foregoing reasoning it should be pointed out that even though the coefficients of thermal expansion of the ceramic cylinder and metal sleeve are equal and compatible, the metal has a tendency to get hot first in a furnace and therefore tends to expand away from the ceramic and enlarge the gap to a degree where, on cooling, hydrogen forms faults in the resulting braze. The binding process to be described hereinafter is thus utilized to limit the expansion of the metallic sleeve to that of the ceramic cylinder so that the alloy strip is compressed therebetween and contacts the tapered surfaces of both cylinder and sleeve intimately.

With reference now to Fig. 4, there is illustrated one manner in which the foregoing binding operation may be implemented. As shown in Fig. 4, the outside dimension of metallic sleeve 12 is constrained from expanding during the fusion operation by winding a coil of wire 20 about sleeve 12 and the adjacent region of cylinder 10, the wire being composed of a metal, such as tungsten, whose melting point is sufficiently above the temperature whereat the fusion process is carried out to prevent expansion of the sleeve and whose coefficient of thermal expansion is relatively low. The ends of the wire should of course be clamped or twisted together in a suitable manner to prove an unyielding cage for the seal about to be formed.

Owing to the fact that the edge of the alloy strip employed in forming the seal extends beyond the end of the seal region, and inasmuch as the constituency of the alloy is such that it will wet and subsequently adhere to tungsten, it is further within the contemplation of the invention to provide means for insulating wire 20 from any molten alloy. As shown in Fig. 4 this may be accomplished by placing an oxidized chrome-iron sleeve 22 around the seal region and thereafter placing the wire over this insulating sleeve. It will be recognized by those skilled in the art that the molten alloy cannot wet the adjacent chrome-iron sleeve during the fusion process, and will therefore merely form a minute bead at the edge of the seal region. It should also be noted that it is preferable to utilize an insulating sleeve which has been split lengthwise to facilitate its placement and subsequent removal. In addition, a thin spray coating of 600 mesh alumina may be placed on the chrome-iron alloy sleeve to further prevent wetting by the molten alloy, although this feature of the process is not essential.

After the seal region has been bound securely in the foregoing manner, the fusion process is carried out in the manner described hereinbefore to braze the metallic sleeve 10 to the metallized surface of the ceramic cylinder. In practice the binding applied to the seal region may actually force some of the alloy out of the seal; however, since the alloy remaining completely wet and contacts all adjacent surfaces, no unbrazed areas can result. The binding wire 20 and the insulating sleeve 22 are thereafter removed when the assembly has been cooled to room temperature to complete the formation of the ceramic-to-metal seal.

Referring now to Fig. 5 there is shown a cross-sectional view of a portion of a completed ceramic-to-metal seal in accordance with the invention. By carrying out the process steps as herein described a rigid and hermetic bond is created between the metallic sleeve 12 and the adjacent ceramic of cylinder 10, the seal extending over the entire tapered regions of both of these elements. Moreover the seal region is invariably free from gas traps, pinholes or other imperfections which frequently cause rejection or failure in seals produced by prior art methods. Accordingly the ceramic-to-metal seal is structurally stronger than its prior art counterparts, while the ultimate structure in which the ceramic-to-metal subsequently utilized is virtually immune from failure due to a poor or gaseous seal.

It is to be understood of course, that the article and methods herein set forth may be modified or varied within limits without departing from the spirit or scope of the invention. For example, any suitable metallizing process known to the art may be employed to metallize the ceramic cylinder. Again, for certain applications, and as long as the binding process outlined above is carried out, the ceramic cylinder could be internally tapered and the metal cylinder externally tapered. It should be emphasized, therefore, that the spirit and scope of the invention are to be limited only by the spirit and scope of the appended claims.

What is claimed as new is:

1. In the method of producing a ceramic-to-metal hermetic seal between a metallic sleeve and the metallized surface of a ceramic cylinder, the steps comprising: tapering one end of the ceramic cylinder, tapering one end of the metallic sleeve in a complementary manner to produce a tapered surface that is capable of uniformly engaging with the tapered surface of the ceramic cylinder, metallizing the tapered surface of the ceramic cylinder, alloying nickel and copper to produce a thin alloy sheet which is predominantly copper, forming a hollow conical frustrum from a strip of the alloy sheet and in a shape to fit snugly over the metallized surface of the ceramic cylinder, sandwiching the conical frustrum between the tapered surface of the metallic sleeve and the metallized surface of the ceramic by axially assembling the cylinder and sleeve with their tapered surfaces engaging opposite sides of the formed alloy sheet and applying a relatively small axial force to uniformly stress the alloy between the surface of the cylinder and sleeve, and applying heat to braze the metallic sleeve to the metallized surface of the ceramic to produce a continuous metal bond between the cylinder and sleeve.

2. In the method of claim 1, said conical frustrum sheet being formed to have a surface area at least as great as the tapered surface of the ceramic cylinder.

3. In the method of claim 1, the further step of binding said sleeve and cylinder together in said sandwiched position before applying heat to uniformly stress the members together.

4. In the method of claim 1, said tapering steps producing an angle of taper in the range of 5° to 15° on the cylinder and sleeve with respect to their longitudinal axes.

5. In the method of claim 1, the further step of constraining the tapered end of the metallic sleeve from flaring during the application of heat.

6. In the method of claim 1, the further step of constraining the tapered end of the metallic sleeve from flaring during the application of heat comprising placing an oxidized chrome-iron split-sleeve around the tapered end of the metallic sleeve and the adjacent portion of the ceramic cylinder, and binding the split-sleeve in place with a coil of wire composed of material having a melting point substantially higher than the temperature at which the alloy strip fuses together the tapered regions of the metallic sleeve and ceramic cylinder, and a coefficient of thermal expansion smaller than that of the ceramic cylinder.

7. In the method of claim 1, the step of forming the thin sheet of brazing alloy being performed by alloying between 5 to 15 percent by weight of nickel and 95 to 85 percent by weight of copper.

8. In the method of claim 1, said metallizing step comprising the steps of applying to the untreated tapered surface of the ceramic member a metallizing powder composed essentially of tungsten, iron, and manganese, and heating the tapered surface of the ceramic to a temperature within the range of 1500° C. to 1550° C. for a period of at least twenty minutes.

9. In the method of claim 1, said metallizing step comprising the steps of applying to the untreated tapered surface of the ceramic a metallizing powder consisting essentially of between 80 to 90 percent by weight of tungsten, 10 to 5 percent by weight of iron, and 10 to 5 percent by weight of manganese, and heating the tapered surface of the ceramic to a temperature within the range from 1500° C. to 1550° C. for a period of at least twenty minutes.

10. The method of forming a hermetically sealed end connection between the open end portion of a hollow member of Kovar having a cylindrically shaped end opening portion and a hollow ceramic member having a cylindrically shaped end opening portion comprising the steps of: forming a tapered surface at the cylindrical end portion of the ceramic cylinder, forming a mating tapered surface at the end opening portion of the Kovar member that is capable of uniformly engaging the tapered surface of the ceramic member, metallizing the tapered surface of the ceramic member, preforming a thin strip of uniform thickness of brazing alloy into a hollow frusto-conical configuration and having the same angle of taper as that of said members and having a surface area that is at least as great as the tapered surface of said ceramic member, sandwiching said preformed strip between the tapered surfaces of the metallic and ceramic members by axially assembling the ceramic member and the Kovar member with their tapered surfaces engaging opposite sides of the preformed alloy and applying an axial force to uniformly stress the alloy between the members, and heating the joint formed by said sandwiching members to uniformly fuse the alloy to the entire surface of the ceramic member and to the Kovar member to provide a hermetically sealed brazed joint between the members.

11. The method of hermetically joining a metallic hollow cylindrical member to a ceramic hollow cylindrical member comprising the steps of: forming the surfaces of the end portions of both members to be joined in a complementary taper, bonding a metallizing layer to the tapered surface of the ceramic member to provide a continuous metal covering hermetically bonded to the ceramic, inserting a preformed thin sheet of brazing alloy having a uniform thickness between the tapered surfaces of the members which sheet is preformed in a hollow frusto-conical shape at the same taper as the members to snugly cover the entire tapered surfaces of the members and uniformly space the members apart, applying an axial force to the members and binding said members together in said sandwiched position to uniformly stress the members together, and applying heat to said sandwiched members in a hydrogen atmosphere to fuse the alloy to both surfaces and thereby braze the surfaces together, whereby the alloy uniformly wets the entire tapered surfaces of both members precluding the formation of gas traps, fissures and the like.

References Cited in the file of this patent

UNITED STATES PATENTS

| | | |
|---|---|---|
| 848,978 | Donoghue | Apr. 2, 1907 |
| 1,840,724 | Koehring | Jan. 12, 1932 |
| 1,995,180 | Jennison et al. | Mar. 19, 1935 |
| 2,241,505 | Cuttler | May 13, 1941 |
| 2,279,831 | Lempert et al. | Apr. 14, 1942 |
| 2,282,106 | Underwood | May 5, 1942 |
| 2,454,270 | Braunsdorff | Nov. 23, 1948 |
| 2,680,824 | Beggs | June 8, 1954 |
| 2,798,577 | La Forge | July 9, 1957 |
| 2,848,801 | Eber | Aug. 26, 1958 |